United States Patent

Nickel et al.

[11] 3,926,546
[45] Dec. 16, 1975

[54] POLYHYDROXYALKYLAMINE SALTS OF ANIONIC DYESTUFFS

[75] Inventors: Horst Nickel, Leverkusen; Karl-Heinz Schündehütte, Opladen, both of Germany

[73] Assignee: Bayer Aktiengesellschaft, Leverkusen-Bayerwerk, Germany

[22] Filed: Oct. 4, 1973

[21] Appl. No.: 403,465

Related U.S. Application Data

[62] Division of Ser. No. 191,076, Oct. 20, 1971, abandoned.

[30] Foreign Application Priority Data
Oct. 20, 1970 Germany............................ 2051303

[52] U.S. Cl. ................................ 8/12; 8/54; 8/54.2; 8/88; 8/172
[51] Int. Cl.² ..................................... D06P 1/68
[58] Field of Search ............ 8/54.2, 12, 172, 54, 88, 8/79

[56] References Cited
UNITED STATES PATENTS
2,073,116  3/1937  Nuslein ................................. 8/88

3,352,755  11/1967  Lerner ................................. 8/85

OTHER PUBLICATIONS
Diserens Chemical Technology of Dyeing & Printing, Pub. 1948 by Reinhold Pub. Corp. pp. 8–13, 59 & 306.

Primary Examiner—Donald Levy
Attorney, Agent, or Firm—Plumley & Tyner

[57] ABSTRACT

Salts of anionic dyestuffs with polyhydroxyalkylamines of the formula

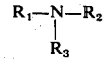

wherein $R_1$, $R_2$ and $R_3$ have the meaning given in the description, and their use for the dyeing and printing of materials containing hydroxyl groups and nitrogen, preferably of a textile nature, especially materials of native or regenerated cellulose, such as cotton, rayon and paper, as well as wool, silk, leather, synthetic polyamides and polyurethanes.

2 Claims, No Drawings

POLYHYDROXYALKYLAMINE SALTS OF ANIONIC DYESTUFFS

This is a division of application Ser. No. 191,076, filed Oct. 20, 1971, now abandoned.

The subject of the invention are salts of anionic dyestuffs — preferably dyestuffs containing sulphonic acid groups — with polyhydroxyalkylamines of the formula

wherein
$R_1$ and $R_2$ independently of one another denote hydrogen, lower alkyl, preferably methyl, or lower hydroxyalkyl, preferably hydroxymethyl or hydroxyethyl, and
$R_3$ denotes a polyhydroxyalkyl radical, preferably having 3 – 6 C atoms.

A preferred group of polyhydroxyalkyl radicals $R_3$ are those of the formula

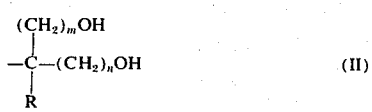

wherein
R denotes hydrogen, lower alkyl, preferably methyl, or lower hydroxyalkyl, preferably hydroxymethyl, and
$m$ and $n$ each denote an integer, which may be identical or different.

A further subject of the invention are stable, concentrated aqueous, aqueous-organic or organic dyeing preparations which contain salts of anionic dyestuffs — preferably dyestuffs containing sulphonic acid groups — with polyhydroxyalkylamines (I), as well as processes for their manufacture.

A further subject of the invention are pulverulent dyeing preparations which contain salts of anionic dyestuffs with polyhydroxyalkylamines (I) and, if appropriate, further customary auxiliaries.

By anionic dyestuffs there are understood those which because of the presence in the molecule of one or more "acid" groups which can form anions, are capable of forming salts with cations.

Possible acid groups are, for example: the carboxyl radical, the sulphinic acid radical, the sulphamide, sulphalkylamide, sulpharylamide, and sulpharalkylamide radical, the disulphonimide radical, the phosphinic acid radical, the phosphonic acid radical, the sulphuric acid radical ($-OSO_3H$), the sulphurous acid radical, the mercapto radical and the thiosulphonic acid radical ($-SSO_3H$), but especially, and preferably, the sulphonic acid radical ($-SO_3H$).

Anionic dyestuffs of the type defined can belong to the most diverse classes of dyestuffs and can be free of metal or contain metal.

Dyestuffs are here also to be understood to include so-called optical brighteners.

The following dyestuffs may be mentioned as examples: azo, anthraquinone, triphenylmethane, oxazine, phthalocyanine and nitro dyestuffs.

The azo dyestuffs can be monoazo and polyazo types, which can be both in the form of pure (metal-free) acid dyestuffs and in the form of metal complex dyestuffs of the 1:1 or 1:2 type.

In the case of the metal complex dyestuffs, heavy metal complexes with, for example, chromium, cobalt, copper, nickel and iron, or mixtures of such complex dyestuffs are preferably employed.

The classes of dyestuffs mentioned can belong to the most diverse application types. For example, they can be substantive dyestuffs, paper dyestuffs, reactive dyestuffs with one or more reactive radicals for cotton and wool, acid dyestuffs for wool or polyamide, or metal complex dyestuffs, and they can be used for dyeing from a dyeing liquor or for printing using a printing paste.

Anionic optical brighteners can also belong to different classes of substance, for example to the stilbene series (monosulpho, disulpho or polysulpho), the 1,3-diarylpyrazoline series or the triazole, coumarine or oxazole series.

The following polyhydroxyalkylamines (I) may be mentioned by way of examples: 2-amino-propanediol-(1,3), 2-amino-butanediol-(1,4), 2-amino-pentanediol-(1,5), 2-amino-2-methyl-propanediol-(1,3), 2-amino-2-methylol-propanediol-(1,3), 2-amino-2-ethyl-propanediol-(1,3), 2-amino-2-propyl-propanediol-(1,3) and 2-amino-2-isopropyl-propanediol-(1,3), 2-amino-2-methoxymethyl-propanediol-(1,3), 2-hydroxyethylamino-trishydroxymethyl-methane, 3-hydroxypropylamino-trishydroxymethyl-methane, 2,3-dihydroxypropylamino-trishydroxymethyl-methane, 2-dimethylamino-2-methyl-propanediol-(1,3), and also the polyhydroxylalkylamides obtainable by reductive amination of sugars, for example D-glucamine, N-methyl-D-glucamine, N,N-dimethyl-D-glucamine, N-(2-hydroxyethyl)-D-glucamine, N-N-(di-2-hydroxyethyl)-D-blucamine, D-glucosamine, 2-amino-2-desoxy-D-glucitol, 2-methylamino-2-desoxy-D-glucitol and xylamine.

The salts of the anionic dyestuffs with the polyhydroxyalkylamines are manufactured by bringing the acid of the anionic dyestuff into contact with the polyhydroxyalkylamines, in bulk (dry or as a moist paste) or in solution, for example by mixing, stirring together or kneading together. The mixture of the components in bulk can be used as a dyeing preparation, either as it is or with admixture of diluents (extenders) of the usual type such as monomeric or polymeric inorganic or organic salts or neutral substances, sugars, dextrins, urea(s), lignin materials, or mixtures of such substances, optionally with the addition of customary dispersing agents. The amount of polyhydroxyalkylamine (I) to be added can vary within wide limits. It depends, in general, on the number of anionic — preferably sulphonic acid — groups contained in the anionic dyestuff.

Correspondingly, stoichiometric amounts are used if desired. Frequently, however, smaller amounts also suffice, in which case other cations, such as alkalis, for example sodium, potassium, lithium, ammonium or other amines, can be present. Relative to the weight of the anionic dyestuff, about 1–40%, preferably 3–30%, of polyhydroxyalkylamine are employed in order to achieve optimum properties, for example with respect to the solubility of the dyeing preparation.

After mixing the components in solution it is necessary, in order to obtain a solid pulverulent dyeing preparation, to isolate the dye salt according to the customary methods, for example by salting out with sodium chloride, potassium chloride or other salts and subsequent drying, or to effect a direct isolation by spray drying (which will be followed by the customary making-up of the dyestuff, as mentioned above).

Stable, concentrated solutions of salts of anionic dyestuffs with polyhydroxyalkylamines (I) are obtained in an aqueous medium, in an aqueous-organic medium or in an organic solvent or solvent mixture. Solubilising agents, such as urea, dextrins or surface-active agents can be added to the aqueous medium and also to the aqueous-organic medium. The solutions can, in particular, also contain excess polyhydroxyalkylamine (I).

Suitable organic solvents are, for example, formamide, methylformamide, dimethylformamide, dimethylsulphoxide, acetonitrile, ethanol, propanol, isopropanol, dioxane, tetrahydrofurane, glycol, glycol monomethyl- or -ethyl-ether, glycol methyl- or -ethyl-ether and polyglycol ethers of customary commercial origin, glycerol and aminoethanols.

Such stable, concentrated solutions contain salts of anionic dyestuffs with polyhydroxyalkylamines (I), or mixtures of such dyestuffs, in a concentration of about 5 to 60%, preferably 20 to 50%.

The solutions of the dye salts are manufactured by a. dissolving the dye salts in the desired solvent or solvent mixture, optionally with the addition of solubilising agents such as urea, dextrin or surface-active agents, or b. dissolving the dye-acid, with addition of the polyhydroxyalkylamine (I) and the solvent or solvent mixture, optionally in the presence of solubilising agents, or c. manufacturing the anionic dyestuffs in the presence of the polyhydroxyalkylamines (I) or of mixtures of such amines and, if appropriate, adding suitable solvents, as well as solubilising agents, to the mixtures thus obtained.

The manufacture of the anionic dyestuffs in the presence of polyhydroxyalkylamines (I) in such a way that at the end of the manufacturing process solutions of the salts have been obtained will always be possible if no reaction, or no interfering reaction, occurs between the polyhydroxyalkylamine (I) and the reactants employed for the desired dyestuff manufacture.

As possible manufacturing processes in the presence of polyhydroxyalkylamines (I) there may, for example, be mentioned: azo coupling from diazonium salts and coupling components (here the most common case will be that the coupling component is employed as a salt with the polyhydroxyalkylamine (I) and the diazonium salt is then added at the customary temperatures for the azo coupling reaction), acylation reactions of intermediate products, for example the phosgenation of aminoazo compounds or of aminohydroxynaphthalenesulphonic acids, the condensation of aminoazo compounds or of aminohydroxy compounds with reactive components, for example cyanuric chloride, and metallisation reactions, such as, for example, the introduction of copper, chromium or cobalt into azo dyestuffs in accordance with the customary known methods.

The new dyestuffs and dyeing preparations are valuable products which are suitable for the most diverse end uses. The solutions of the new dye salt preparations are distinguished by stability and miscibility. The dyeing preparations obtainable are for example valuable for dyeing and printing materials containing hydroxyl groups and nitrogen, preferably of a textile nature, especially materials of native or regenerated cellulose such as cotton, rayon and paper, as well as wool, silk, leather, synthetic polyamides and polyurethanes, in accordance with the processes and techniques customary for these materials.

EXAMPLE 1

A. 0.2 mol of an approximately 60% strength diazo paste of 2-amino-naphthalene-6-sulphonic acid, prepared in the usual manner, is introduced in portions over the course of about 10 minutes, whilst stirring, into a solution of 50.4 parts (0.1 mol) of N,N'-bis-[5-hydroxy-7-sulphonaphthyl-(2)]-urea (J-acid-urea), 61 parts of 2-amino-2-hydroxymethyl-propanediol-(1,3) and 850 parts of distilled water, kept at 50°C. Thereafter the mixture is stirred for half an hour at 50°C and is then allowed to cool whilst stirring.

The resulting dyestuff solution is filtered at room temperature. The filter shows no dyestuff residues. About 1300 parts of dyestuff solution are obtained, which are well suited to dyeing paper in clear red shades.

B. A similar dyestuff solution is obtained if 150 parts of 10% strength aqueous sodium bicarbonate solution are added to a solution of 50.4 parts (0.1 mol) of N,N'-bis-[5-hydroxy-7-sulpho-naphthyl-(2)]-urea, 30 parts of 2-amino-2-hydroxymethyl-propanediol-(1,3) and 680 parts of distilled water and 0.2 mol of an approximately 60% strength diazo paste of 2-amino-naphthalene-6-sulphonic acid is introduced in portions over the course of about 10 minutes, at 50°C, whilst stirring, and the mixture is stirred for half an hour, allowed to cool and filtered.

C. A similar dyestuff solution is obtained if 0.2 mol of an approximately 60% strength diazo paste of 2-amino-naphthalene-6-sulphonic acid is added over the course of about 10 minutes to a solution of 0.1 mol of J-acid-urea, 30 parts of 2-amino-2-hydroxymethyl-propanediol-(1,3), 5 parts of 25% strength aqueous ammonia and 850 parts of distilled water at 50°C, whilst stirring, and the mixture is stirred for a further half hour, allowed to cool to room temperature and filtered.

Instruction for dyeing paper

200 Parts of paper composition — containing sulphite cellulose and water — (corresponding to about 5 parts of dry composition) are mixed with 500 parts of water and the dilute dyestuff solution, consisting of 1 part of the dyeing preparation according to the above example and 100 parts of water, is added and the mixture stirred. After about 10 minutes, sizing and fixing is carried out in the usual manner. Thereafter, the liquid is sucked off on the wire; the product is then pressed and dried and a sheet of paper dyed a clear red is obtained.

Instruction for dyeing cellulose

100 Parts of cotton are introduced, at room temperature, into a dyebath which contains 4 parts of the above dyestuff solution, 2 parts of sodium carbonate and 20 parts of sodium sulphate dissolved in 5000 parts of water. The dyebath is heated to 90°–95°C over the course of about half an hour and is kept thereat for half an hour. Thereafter, the dyed cotton is rinsed and dried. A red dyeing is obtained.

EXAMPLE 2

23.9 Parts (0.1 mol) of 2-amino-5-hydroxy-naphthalene-7-sulphonic acid (J-acid) are dissolved in 200 parts of water and 12 parts of 2-amino-2-hydroxymethyl-propanediol-(1,3) at room temperature. Thereafter phosgene is passed in at a temperature of about 30°C, whilst keeping the pH value at 5 to 6 by adding about 18 parts of 2-amino-2-methylol-propanediol-(1,3) in portions, until the formation of urea is complete. 0.1 mol of an approximately 60% strength diazo paste of 2-aminonaphthalene-6-sulphonic acid, prepared in the usual manner, is then introduced into the solution obtained over the course of about 5 minutes at 40°–50°C, whilst stirring, and the mixture is stirred for a further 30 minutes, diluted with water to the desired colour strength is desired, and then left stirring until cold. The mixture is filtered and a clear, stable dyestuff solution is obtained, which dyes paper in clear red shades.

If, instead of the diazo paste of 2-amino-naphthalene-6-sulphonic acid, an equivalent amount of the diazo paste of 2-amino-naphthalene-5- or -7-sulphonic acid is used, dyestuff solutions are obtained which are suitable for dyeing paper in red shades.

If 2-amino-naphthalene-1,5-disulphonic acid is used as the diazo component, a yellowish-tinged red dyestuff solution is obtained, which is evaporated to dryness if desired, or yields a dyestuff powder of good solubility by salting out and drying.

EXAMPLE 3

0.1 Mol of sodium 5,5'-dihydroxy-2,2'-dinaphthylamine-7,7'-disulphonate are dissolved in 33 parts of 2-amino-2-methylol-propanediol-(1,3) and 650 parts of water at 50°C. 200 parts of 10% strength sodium bicarbonate solution are added and 0.2 mol of an approximately 60% strength diazo paste of 2-amino-naphthalene-6-sulphonic acid is gradually introduced over the course of 5 minutes, whilst stirring. After 30 minutes' stirring at 50°C, the mixture is stirred until cold and filtered. About 1050 parts of dyestuff solution are obtained. Paper and cotton are dyed in clear purple-coloured shades by means of this dyeing preparation. On spray-drying, a loose dyestuff powder is obtained.

EXAMPLE 4

0.1 Mol of [4-amino-2-acetylaminobenzene-azo]-naphthalene-(2)-4,8-disulphonic acid are dissolved hot in 14 parts of 2-amino-2-methylol-propanediol-(1,3) and 800 parts of water. Phosgene is now passed in at 40° to 50°C and the mixture is kept neutral by sprinkling in solid sodium carbonate, until the formation of urea is complete. The dyestuff solution is evaporated to dryness and a dark, easily soluble powder is obtained. The dyestuff preparation dyes cotton in yellow shades. Sodium sulphate is mixed in, if desired, for adjusting the dyeing preparation.

Dyestuff preparations which contain a urea compound are obtained analogously on starting from the following aminoazo compounds: [4-amino-2-methyl-benzeneazo]-naphthalene-(2)-4,8-disulphonic acid, [4-amino-benzeneazo]-naphthalene-(2)-4,8-disulphonic acid, [4-amino-2-ureido-benzeneazo]-naphthalene-(2)-4,8-disulphonic acid, [4-amino-2-methoxybenzeneazo]-naphthalene-(2)-4,8- and -6,8-disulphonic acid, 4-amino-azobenzene-4'-sulphonic acid, 4-amino-3-methoxy-azobenzene-4'-sulphonic acid, [4-amino-3-methoxy-5-methylbenzeneazo]-naphthalene-(2)-4,8- or -6,8- or -5,7-disulphonic acid, [4-amino-3-methoxy-5-methylbenzeneazo]-naphthalene-(1)-3,6- or -3,7-disulphonic acid.

If [4-amino-3-methoxy-5-methylbenzeneazo]-naphthalene-(1)-8-(benzenesulphonylhydroxy)-3,6-disulphonic acid is used as the aminoazo compound and the benzenesulphonyl radical is split off under alkaline conditions after the phosgenation, a dyeing preparation is obtained which dyes cotton in red shades.

EXAMPLE 5

0.1 Mol of the diazo dyestuff anthranilic acid → J-acid-urea in 2000 parts of water is stirred with 27 parts of 2-amino-2-hydroxymethyl-propanediol-(1,3) and the mixture is warmed to about 85°C. It is kept at this temperature, a solution of 280 parts of 18% strength cupric sulphate solution and 140 parts of 25% strength aqueous ammonia is run in, and the mixture is then stirred for about a further hour until the introduction of copper is complete. Thereafter the dyestuff is isolated, and dried, in the usual manner. The resulting dyestuff powder is adjusted to the desired colour strength by adding crystalline sodium sulphate. The dyeing preparation dyes cotton in red-brown shades.

Copper is introduced into 0.1 mol of the disazo dyestuff 2-aminophenol-4-sulphonic acid → J-acid-urea, in the presence of 30 parts of 2-amino-2-hydroxymethyl-propanediol-(1,3), by warming with 0.2 mol of ammoniacal cupric sulphate solution, and the mixture is thereafter evaporated. An easily soluble dyestuff powder is obtained, which dyes cotton in light-fast red-violet shades. A similar dyestuff powder is obtained by starting from the disazo dyestuff 2-aminoanisole-4-sulphonic acid → J-acid-urea, introducing copper under demethylating conditions, and evaporating.

EXAMPLE 6

Dyeing preparations of good solubility are obtained, for example, by carrying out the following preparations:

A. 30 parts of 1-[2-trifluoromethyl-4-chlorobenzeneazo]-2-amino-8-hydroxynaphthalene-6-sulphonic acid, 10 parts of 2-amino-2-methylol-propanediol-(1,3) and 60 parts of dextrin are mixed. A dyeing preparation which dyes polyamide in red shades is obtained.

B. 35 parts of 1-[2-trifluoromethyl-4-chlorobenzeneazo]-2-amino-8-hydroxynaphthalene-5-sulphonic acid, 5 parts of 2-amino-2-methyl-propanediol-(1,3) and 60 parts of dextrin are mixed.

The resulting dyeing preparation dyes polyamide in red shades.

C. 35 parts of 1-[2-trifluoromethyl-4-chlorobenzeneazo]-2-amino-8-hydroxynaphthalene-5-sulphonic acid, 5 parts of 2-amino-2-hydroxymethyl-propanediol-(1,3) and 60 parts of cane sugar are mixed. The dyeing preparation dyes polyamide in red shades.

D. 0.1 mol of the disazo dyestuff paste, of pH value 5–6, obtained by coupling tetrazotised 4,4'-diamino-3,3'-dimethoxy-1,1'-diphenyl with 1-amino-8-hydroxynaphthalene-3,6-disulphonic acid and introducing copper under demethylating conditions, is kneaded with 10 parts of 2-amino-2-methylol-propanediol-(1,3) and the mixture is subsequently dried. An easily soluble dyestuff powder is obtained, which can be brought to the desired colour strength by admixture of diluents such as, for example sodium sulphate. It is also suitable for the manufacture of a stable aqueous dyestuff solution.

If, instead of 2-amino-2-methylol-propanediol-(1,3), 15 parts of 2-amino-2-methyl-propanediol-(1,3) are used, dyeing preparations of similar stability are obtained, which dye cotton and paper in clear blue shades.

E. 60 Parts of the reactive dyestuff obtained by coupling diazotised 2-amino-4-[2',6'-difluoro-5'-chloropyrimidinyl-(4')-amino]-benzene-(1)-sulphonic acid with 2-acetylamino-8-hydroxy-naphthalene-6-sulphonic acid, are mixed with 5 parts of 2-amino-2-methylol-propanediol-(1,3) and 35 parts of dextrin. A dyeing preparation which dyes wool reactively in scarlet-red shades is obtained.

F. 50 Parts of the copper-treated reactive dyestuff of 1',2,8-trihydroxy-7'-[2,6-difluoro-5-chloropyrimidinyl-4-amino]-azonaphthalene-(1,2)-3,4',6-trisulphonic acid are mixed with 7.5 parts of 2-amino-2-methylol-propanediol-(1,3) and 42.5 parts of urea. A dyeing preparation which dyes cotton reactively in blue shades is obtained.

G. 0.1 Mol of 4'-(benzeneazo)-4-ethoxy-azobenzene-2-sulphonic acid, as a moist paste, is kneaded with 12 parts of 2-amino-2-methylol-propanediol-(1,3) or with 10 parts of 2-amino-2-methyl-propanediol-(1,3) and the mixture is dried. The dry product is mixed with cane sugar in approximately the ratio of 1:1 and yields a dyeing preparation which dyes polyamide in golden yellow shades.

H. 0.1 mol of the dyestuff Colour Index 29,065, as a moist acid paste, is kneaded with 20 parts of 2-amino-2-methylol-propanediol-(1,3) and the mixture is dried. The dry product is mixed with extenders in accordance with the required colour strength.

I. 0.1 mol of the dyestuff Colour Index 27,720, as a moist acid paste, is kneaded with 10 parts of 2-amino-2-methyl-propanediol-(1,3) and the mixture is dried and adjusted in the usual manner.

EXAMPLE 7

A. 15 parts of the dyestuff C.I. Direct Blue 78 (No. 34,200) are dissolved in 10 parts of 2-amino-2-methyl-propanediol-(1,3) and 300 parts of hot water and the mixture is stirred until cold. After filtration, a stable dyestuff solution is obtained which dyes cotton in blue shades.

If, instead of 2-amino-2-methyl-propanediol-(1,3), 2-amino-2-methylol-propanediol-(1,3) is used, a stable dyestuff solution is again obtained.

B. 15 parts of the dyestuff C.I. Direct Red 72 (No. 29,200) are dissolved in 10 parts of 2-amino-2-methyl-propanediol-(1,3) and 300 parts of hot water. Thereafter the mixture is stirred until cold and filtered. A stable dyestuff solution is obtained.

C. 20 parts of 4,4'-bis-[2''-methoxy-4''-(di-β-hydroxyethyl)amino-s-triazinyl-6''-amino]-stilbene-2,2'-disulphonic acid and 10 parts of 2-amino-2-methyl-propanediol or 2-amino-2-methylol-propanediol are mixed, 120 parts of dimethylformamide are added, and solution is brought about by warming. If necessary, small amounts of residue are filtered off, the filtrate is allowed to cool, and a stable solution of the optical brightener is obtained.

Similar solutions are obtained if instead of dimethylformamide dimethylsulphoxide or methylformamide is used.

I claim:

1. In a process for dyeing and printing textile fiber materials of native or regenerated cellulose, wool, silk, leather, synthetic polyamides or/ and polyurethanes, the improvement comprising applying concentrated, liquid dyeing preparations in diluted form to the textile fiber materials wherein the preparation contains a salt of a dyestuff containing sulphonic acid groups with 2-amino-2-hydroxymethylpropanediol-(1,3).

2. In a process for dyeing and printing fiber materials of native or regenerated cellulose the improvement comprising applying concentrated, liquid dyeing preparations in diluted form to the textile fiber materials wherein the preparation contains a salt of a dyestuff containing sulphonic acid groups with 2-amino-2-hydroxymethylpropanediol-(1,3).

* * * * *